US007010634B2

(12) United States Patent
Silvester

(10) Patent No.: US 7,010,634 B2
(45) Date of Patent: *Mar. 7, 2006

(54) NOTEBOOK COMPUTER WITH INDEPENDENTLY FUNCTIONAL, DOCKABLE CORE COMPUTER

(75) Inventor: Kelan C. Silvester, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 day.

(21) Appl. No.: 09/470,669

(22) Filed: Dec. 23, 1999

(65) Prior Publication Data

US 2003/0126335 A1    Jul. 3, 2003

(51) Int. Cl.
*G06F 13/00* (2006.01)
(52) U.S. Cl. ...................................... 710/303; 710/301
(58) Field of Classification Search ........ 710/301–304; 361/679–686; 707/203
See application file for complete search history.

(56) References Cited

U.S. PATENT DOCUMENTS

| | | | |
|---|---|---|---|
| 5,546,563 A | * | 8/1996 | Chuang ....................... 395/500 |
| 5,625,829 A | * | 4/1997 | Gephardt et al. ............ 710/104 |
| 5,648,762 A | * | 7/1997 | Ichimura et al. ........ 340/825.31 |
| 5,754,798 A | * | 5/1998 | Uehara et al. ............... 395/284 |
| 5,793,957 A | * | 8/1998 | Kikinis et al. .......... 395/200.41 |
| 5,884,049 A | * | 3/1999 | Atkinson ..................... 395/281 |
| 5,999,997 A | * | 12/1999 | Pipes .......................... 710/303 |
| 6,044,452 A | * | 3/2000 | Birch et al. .................... 712/28 |
| 6,089,459 A | * | 7/2000 | Eisele et al. ................. 235/492 |
| 6,128,661 A | * | 10/2000 | Flanagin et al. ............ 709/227 |
| 6,473,789 B1 | * | 10/2002 | Chen et al. .................. 709/213 |
| 6,523,079 B1 | * | 2/2003 | Kikinis et al. .............. 710/303 |

* cited by examiner

*Primary Examiner*—Thomas Lee
*Assistant Examiner*—Trisha Vu
(74) *Attorney, Agent, or Firm*—Blakely, Sokoloff, Taylor & Zafman LLP

(57) ABSTRACT

A notebook computer includes a docking port to receive a core computer. The processor of the core computer serves as the system processor for the notebook computer when the core computer is docked in the notebook computer. When the core computer is undocked, the processor serves as the system processor for the core computer. The core computer may boot a mini operating system when undocked, whereas the notebook computer may boot a full operating system when the core computer is docked. The processor of the core computer may operate at a lower voltage and at a lower frequency when serving as the system processor for the core computer than when serving as the system processor for the notebook computer. When the core computer is docked, the notebook computer memory is synchronized with the core computer memory, and a battery in the core computer is charged.

14 Claims, 2 Drawing Sheets

NOTEBOOK COMPUTER WITH INDEPENDENTLY FUNCTIONAL, DOCKABLE CORE COMPUTER

The present invention relates to computer systems and more particularly to a computer system having a docking port that receives an electronic device comprising a processor and providing independent functionality.

BACKGROUND

Notebook computers, including laptops, sub-notebooks, and other mobile computers that include a keyboard and display, are becoming increasingly pervasive in our society. Notebook computers are also becoming increasingly powerful, able to effortlessly run applications that include presentation graphics, spreadsheets, and word processors. Unfortunately, notebook computers may be unnecessarily large and heavy for certain applications. For example, a notebook computer may include applications to schedule appointments in an electronic calendar or to store names and numbers in an electronic address book. If a user intends to use only these applications during a particular period of time, a good portion of the bulk of a typical notebook computer may be superfluous. Instead, all that may be needed is a small, hand-held device such as a personal data assistant (PDA).

Unfortunately, to realize the advantages of both a PDA for running simple applications and a notebook computer for running more advanced applications, a user must purchase one of each. Much of the electronics contained in a PDA and in a notebook computer, however, is redundant.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a notebook computer includes a docking port (or bay) to receive a core computer. The processor of the core computer serves as the system processor for the notebook computer when the core computer is docked in the notebook computer. When the core computer is undocked, the processor serves as the system processor for the core computer. The core computer includes memory containing a mini operating system to be booted when undocked, and the notebook computer includes memory containing a full operating system to be booted when the core computer is docked. When the core computer is docked, the notebook computer memory is synchronized with the core computer memory, a battery in the core computer is charged, and the processor runs at a higher frequency and higher voltage than when the core computer is undocked.

A more detailed description of embodiments of the present invention, including various configurations and implementations, is provided below.

As used herein, the term "when" is intended to mean during all or some portion of time within the period of time that satisfies a condition, as opposed to the term "whenever" which is intended to mean during the entire period of time that satisfies a condition. For example, the statement that a computer charges the battery of a device when the device is docked is intended to mean that the battery may be charged during all or some portion of the period of time during which the device is docked. The term "data" is used herein to describe data, instructions, addresses, or any other information that can be represented by one or more bits.

Figure 1:
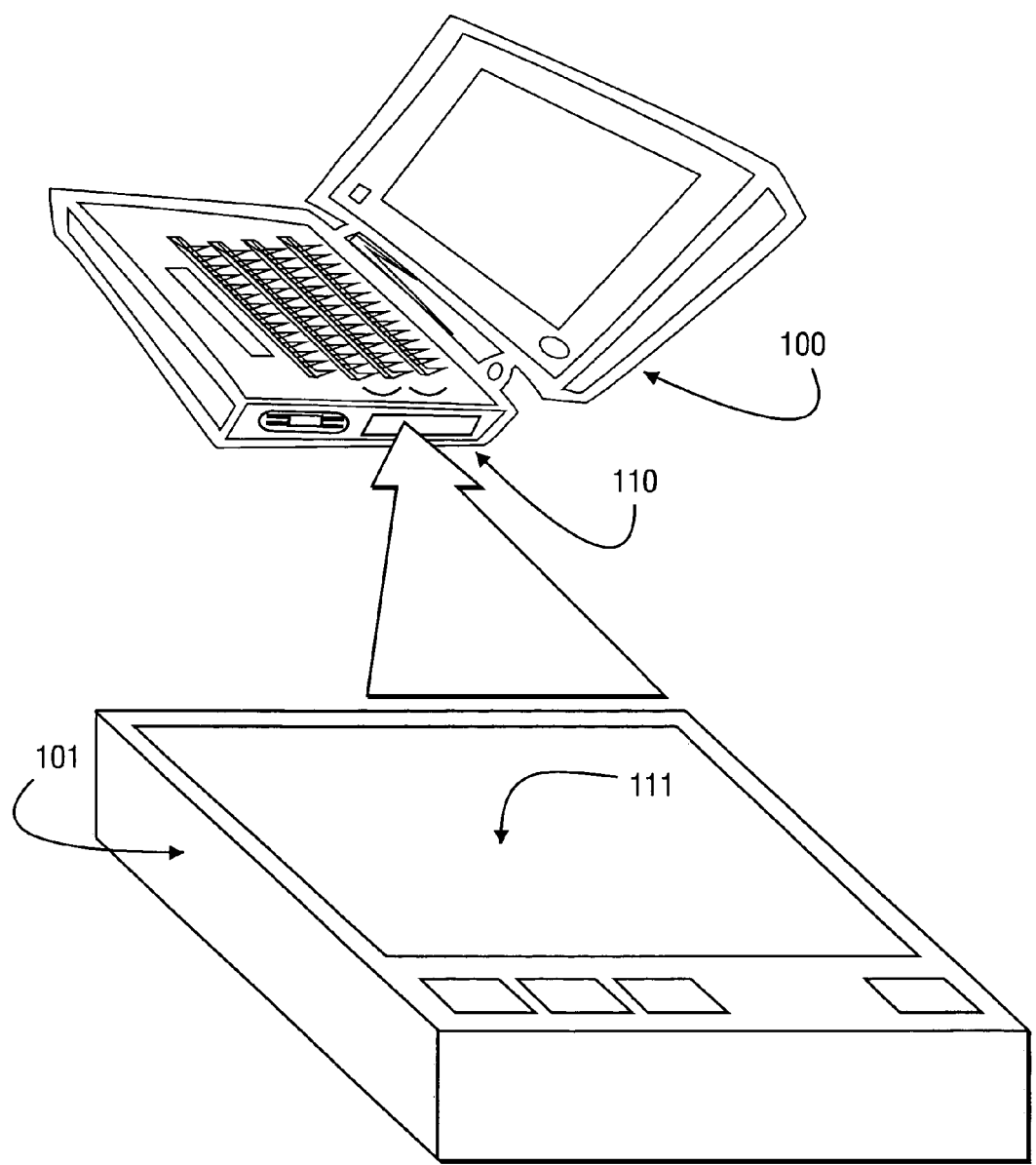
FIG. 1 is a computer system and undocked electronic device formed in accordance with an embodiment of the present invention.

FIG. 1 is a notebook computer 100 and undocked electronic device 101 formed in accordance with an embodiment of the present invention. Notebook computer 100 includes docking port 110 designed to receive electronic device 101. A notebook computer is any type of mobile computer such as a laptop, sub-notebook, or tablet computer. For an alternate embodiment of the present invention, the notebook computer may be any base computer including, for example, a mobile computer, desktop computer, workstation, or server.

Electronic device 101 of FIG. 1 is capable of operating in two modes. In a first mode, electronic device 101 is docked into computer 100. When in this mode, computer 100 is able to access data stored in electronic device 101, and the processor in electronic device 101 operates as the system processor of the notebook computer. In a second mode, electronic device 101 is undocked. When in this mode, electronic device 101 functions as a personal data assistant (PDA) or other hand-held, independently functional computer system. Electronic device 101 may hereinafter be referred to as a "core computer."

The housing of core computer 101 of FIG. 1 is designed to be docked into docking port 110 of computer 100. Core computer 101 may include user input and output capabilities integrated into the housing of the core computer, such as visual display 111 (which may be, for example, a liquid crystal display) to display information and to receive pen-based entries. For an alternate embodiment of the present invention, core computer 101 may include one or more sockets to attach additional, separate output devices such as, for example, a visual display, headphones, or a flash memory device. Core computer 101 may also include one or more sockets to attach additional, separate input devices such as, for example, a mouse, a tablet or visual display for pen-based entries, a microphone, a keyboard, or a flash memory device.

Core computer 101 may include a battery (either permanent or removable) to power the processor and other components of the core computer when the core computer is operating in its undocked, independent mode. When docked, the battery may be charged by the power supply of notebook computer 100 as described in more detail below.

Figure 2:
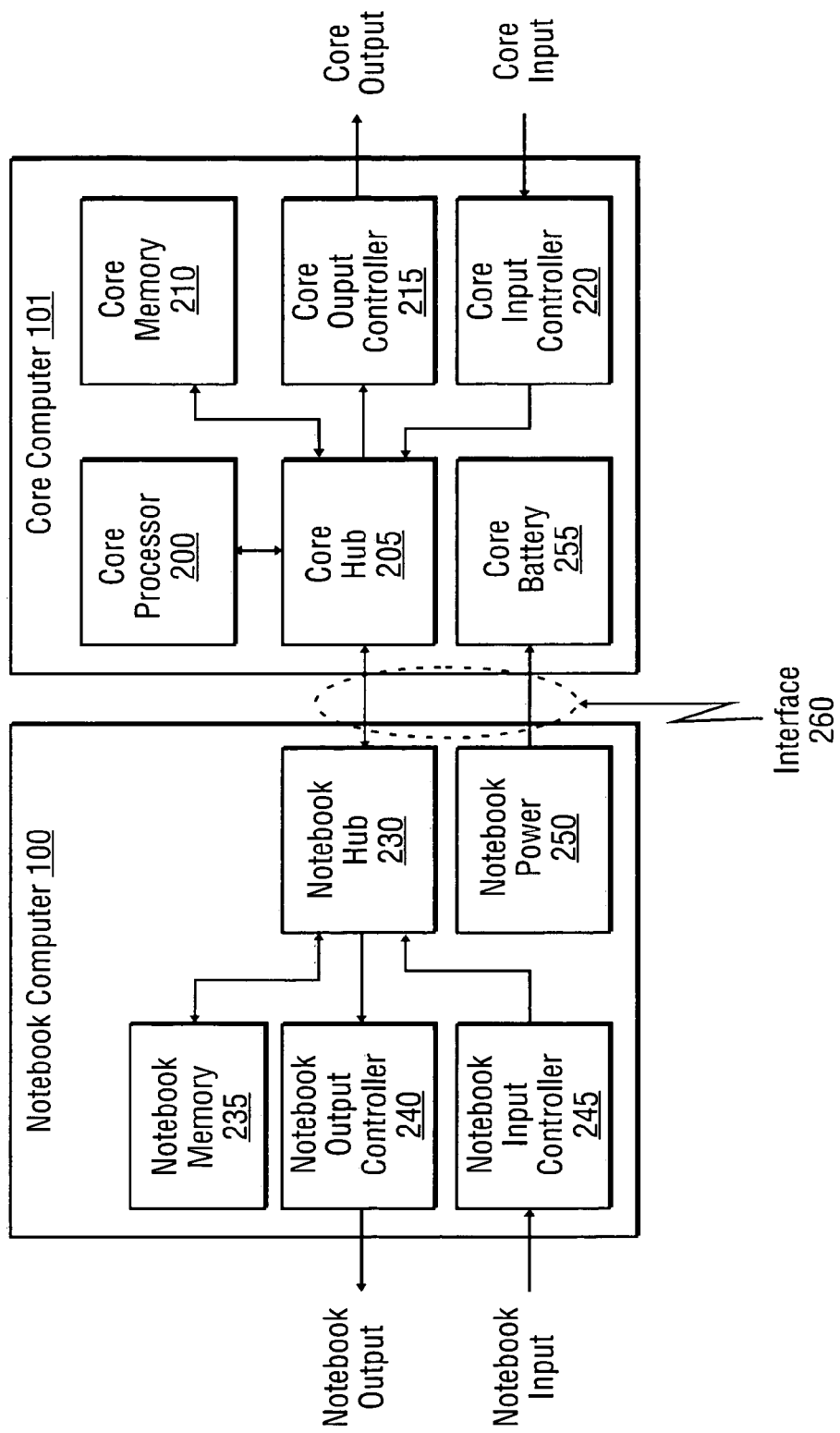
FIG. 2 is a schematic diagram of the computer system and electronic device of FIG. 1 when the electronic device is docked in the computer system.

FIG. 2 is a schematic diagram of notebook computer 100 and core computer 101 when the core computer is docked in the notebook computer. Core computer 101 includes core processor 200 coupled to core hub 205. Core hub 205 enables communication between core processor 200 and core memory 210, core output controller 215, and core input controller 220 to which it is coupled. Core hub 205 is also coupled to interface 260. In addition, core computer 101 includes battery 255 coupled to interface 260. Notebook computer 100 includes notebook hub 230 to enable communication between core hub 205, via interface 260, and notebook memory 235, notebook output controller 240, and notebook input controller 245 to which notebook hub 230 is coupled. In addition, notebook computer 100 includes notebook power supply 250 coupled to interface 260.

Interface 260 of FIG. 2 includes power and ground lines to couple power supply 250 (whether it be driven by a battery or an electrical outlet) of notebook computer 100 to core battery 255 of core computer 101. When docked, the power supply of notebook computer 100 may be used to charge battery 255. For an alternate embodiment of the present invention, the battery of the core computer is not rechargeable and may not be coupled to the power supply of the host computer when the core computer is docked.

By providing power to core processor 200, core hub 205, core memory 210, core output controller 215, and core input controller 220, battery 255 may used to power independent operation of core computer 101 when the core computer is undocked. In addition, battery 255 of FIG. 2 may be used to power these components of core computer 101 when the core computer is docked. For an alternate embodiment, however, the components of the core computer are powered by the power supply of the notebook computer when the core computer is docked. For one embodiment of the present invention, battery 255 includes one or more rechargeable or unrechargeable removable batteries, such as AA batteries, or one or more permanent, rechargeable batteries.

Core output controller 215 of FIG. 2 may be coupled to one or more output interfaces of core computer 101, such as a visual display, a speaker or headphone, an external storage device, or a wireless communication transceiver. Core input controller 220 may be coupled to one or more input interfaces of core computer 101, such as a mouse, a tablet or visual display for pen-based entries, a microphone, a keyboard, an external storage device, or a wireless communication transceiver. Similarly, notebook output controller 240 may be coupled to one or more output interfaces of notebook computer 100, such as a visual display, a speaker or headphone, or external storage device. Notebook input controller 245 may be coupled to one or more input interfaces of notebook computer 100, such as a mouse, a tablet or visual display for pen-based entries, a microphone, a keyboard, or an external storage device.

For one embodiment of the present invention, the functionality provided by core computer 101 when in undocked, independent operation as a hand-held device is less demanding on core processor 200 of FIG. 2 than the demands made on the processor by notebook computer 100 when the core computer is docked. For example, core computer 101 may run relatively simple electronic calendaring, name/number addressing, and email viewing applications when undocked. In contrast, notebook computer 100 may additionally run spreadsheet, word processing, photo editing, video editing or playback, high resolution graphics gaming, or presentation applications when core computer 101 is docked. The difference in performance demands made on core processor 200 when undocked versus when docked, coupled with the more limited power supplied by core battery 255 versus that supplied by notebook power supply 250, may promote various design modifications.

For example, for one embodiment of the present invention, core processor 101 of FIG. 2 may operate in one of two or more modes. In a "high power" mode, core processor 101 operates at a nominal voltage and nominal frequency. In a "low power" mode, core processor 101 operates at a lower voltage, a lower frequency, or both a lower voltage and lower frequency in comparison to the nominal voltage and nominal frequency. When operating as the system processor of undocked core computer 101, core processor 101 may operate in the low power mode. When operating as the system processor of notebook computer 100 (i.e. with core computer 101 docked), core processor 101 may operate in the high power mode.

For an alternate embodiment of the present invention, the core processor may operate in a high power mode when operating as the system processor of undocked core computer 101. This embodiment may be found useful if, for example, additional processing power is needed or desired, according to user preference, or one or more other factors are considered such as available electrical power. For another embodiment, the core processor may operate in a low power mode when operating as the system processor of notebook computer 100 (i.e. with core computer 101 docked). This embodiment may be found useful if, for example, less processing power is needed or desired, according to user preference (e.g. to extend battery life), or one or more other factors are considered such as available electrical power or thermal management (e.g. processor overheating). The core processor may switch between the low and high power modes of operation during a single session, or the switch may require a shut-down and re-boot of the system.

For one embodiment, interface 260 may additionally include a thermal interface between core computer 101 and notebook computer 100. This thermal interface may serve to dissipate heat from core processor 200 to notebook computer 100 (and to the ambient environment) when core processor 200 operates as the system processor of the notebook computer with core computer 101 docked.

For another embodiment of the present invention, core memory 210 of FIG. 2 may include a mini operating system to be booted and run on core computer 101 when in its undocked, independent, hand-held mode of operation. For this embodiment, notebook memory 235 may include a full operating system to be booted and run on notebook computer 100 when core computer 101 is docked. As used herein, the terms mini and full, as applied to an operating system, are relative terms with respect to each other, wherein a mini operating system is smaller in size and provides lesser functionality than a full operating system. The mini and full operating systems may include the same core operating system. The mini operating system may be a subset of the full operating system or may include additional components to provide different and reduced functionality in comparison to the full operating system, and to support fewer or different devices.

Core memory 210 of FIG. 2 may include dynamic random-access-memory (DRAM) and flash memory or other electrically programmable read-only-memory (EPROM). The non-volatile memory of core memory 210 stores the mini operating system and application software that enables core computer 101 to operate in its independent, undocked mode. The volatile memory (e.g. DRAM) of core memory 210 may function as the main system memory for core processor 200 when core processor 200 operates as the system processor of undocked core computer 101.

Notebook memory 235 of FIG. 2 may include DRAM to function as the main system memory for core processor 200 when core processor 200 operates as the system processor of notebook computer 100 (i.e. when core computer 101 is docked). For an alternate embodiment of the present invention, core memory 210 of core computer 101, alone or in addition to notebook memory 235, functions as the main system memory for core processor 200 when core processor 200 operates as the system processor of notebook computer 100. Notebook memory 235 of FIG. 2 may additionally include non-volatile storage such as a hard drive or CD-ROM.

Data received via core input controller 220 may be stored in core memory 210 of core computer 101 of FIG. 2 when core computer 101 is operating independently while undocked. This newly received data may update stale data that was previously stored in core memory 210. This stale data may also have been previously stored in notebook memory 235 of notebook computer 100. In accordance with one embodiment of the present invention, when core computer 101 is docked into notebook computer 100, core memory 210 synchronizes with notebook memory 235. During the synchronization process, newly stored data that updates stale data in core memory 210 is provided to notebook memory 235, via interface 260, to similarly update the stale data in notebook memory 235. For one embodiment of the present invention, synchronizing the memory occurs automatically when core computer 101 is docked. For another embodiment, synchronizing the memory occurs in response to a user request.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. An electronic device comprising:
   a housing to have the device docked into a notebook computer having a memory to store a first operating system;
   an interface disposed on a surface of the housing to enable communication between the device and the notebook computer when the device is docked;
   a memory to store a second operating system, the second operating system is smaller in size and provides less functionality than the first operating system; and
   a central processing unit (CPU) to operate as a system processor of the notebook computer when the device is docked and to operate as a system CPU of the device when the device is undocked, wherein the CPU is to operate at a higher frequency and at a higher voltage when the device is docked than when the device is undocked.

2. The electronic device of claim 1, further comprising an input controller to receive input data into the device when the device is undocked.

3. The electronic device of claim 2, further comprising core memory to store the input data when the device is undocked.

4. The electronic device of claim 3, further comprising an output controller to provide output data from the device when the device is undocked.

5. The electronic device of claim 4, further comprising a visual display disposed on a surface of the housing, the visual display being coupled to the input controller to provide the input data via pen-based entries on the display and being coupled to the output controller to provide the output data via the display.

6. The electronic device of claim 1, further comprising a battery to provide power to the CPU when the electronic device is undocked.

7. The electronic device of claim 6, wherein the interface is coupled to the battery to charge the battery when the electronic device is docked.

8. The electronic device of claim 7, wherein the notebook computer is to provide power to the CPU when the electronic device is docked.

9. A notebook computer comprising:
   a docking port to receive a hand-held core computer having a Central Processing Unit (CPU) to operate as a system CPU of the notebook computer when the device is docked, and to operate as a system CPU of the core computer when the core computer is undocked, wherein the CPU is to operate at a higher frequency and at a higher voltage when the CPU operates as a system CPU of the notebook computer than when the CPU operates as a system CPU of the core computer, the hand-held core including a memory to store a first operating system;
   an interface in the docking port to enable communication between the core computer and the notebook computer when the core computer is docked; and
   a memory to store a second operating system, the second operating system is larger in size and has greater functionality than the first operating system.

10. The notebook computer of claim 9, wherein the interface is to couple a power supply of the base computer to a battery in the core computer to charge the battery and to provide power to the CPU when the core computer is docked.

11. The notebook computer of claim 9, wherein the CPU is to operate in one of a high power mode and a low power mode according to user preference.

12. A method of operating a computer system comprising:
   operating a Central Processing Unit (CPU) as a system CPU of a notebook computer when a core computer is docked in a docking port of the notebook computer, the notebook computer including a memory to store a first operating system; and
   operating the CPU as a system CPU of the core computer when the core computer is undocked, the core computer including a memory to store a second operating system, the second operating system is smaller in size and provides less functionality than the first operating system, wherein operating the CPU as a system CPU of the notebook computer includes operating the CPU at a higher frequency and voltage than when operating the CPU as a system CPU of the core computer.

13. The method of claim 12, further comprising synchronizing memory of the notebook computer with memory of the core computer when the core computer is docked.

14. The method of claim 12, further comprising charging a battery in the core computer when the core computer is docked.

* * * * *